US008361326B2

(12) United States Patent
Himmelreich et al.

(10) Patent No.: US 8,361,326 B2
(45) Date of Patent: Jan. 29, 2013

(54) APPARATUS AND METHOD FOR THE TREATMENT OF LIQUIDS WITH MAGNETIC PARTICLES

(75) Inventors: Ralf Himmelreich, Hilden (DE); Thomas Rothmann, Hilden (DE)

(73) Assignee: Qiagen GmbH, Hilden (DE)

(*) Notice: Subject to any disclaimer, the term of this patent is extended or adjusted under 35 U.S.C. 154(b) by 400 days.

(21) Appl. No.: 12/676,376

(22) PCT Filed: Sep. 19, 2008

(86) PCT No.: PCT/EP2008/062539

§ 371 (c)(1),
(2), (4) Date: May 20, 2010

(87) PCT Pub. No.: WO2009/040312

PCT Pub. Date: Apr. 2, 2009

(65) Prior Publication Data

US 2010/0307981 A1 Dec. 9, 2010

(30) Foreign Application Priority Data

Sep. 21, 2007 (DE) ........................ 10 2007 045 474

(51) Int. Cl.
*B01D 35/06* (2006.01)
*B03C 1/02* (2006.01)

(52) U.S. Cl. ........................ 210/695; 210/222; 436/526

(58) Field of Classification Search .................. 210/222, 210/695; 436/526
See application file for complete search history.

(56) References Cited

U.S. PATENT DOCUMENTS

| | | | | |
|---|---|---|---|---|
| 5,897,783 | A * | 4/1999 | Howe et al. | 210/695 |
| 6,020,211 | A * | 2/2000 | Tuunanen | 436/526 |
| 6,065,605 | A | 5/2000 | Korpela et al. | |
| 6,187,270 | B1 | 2/2001 | Schmitt et al. | |
| 2001/0022948 | A1 | 9/2001 | Tuunanen | |
| 2007/0175830 | A1 | 8/2007 | Brassard | |

FOREIGN PATENT DOCUMENTS

| | | | |
|---|---|---|---|
| EP | 0 905 520 | A1 | 3/1999 |
| EP | 0 965 842 | A1 | 12/1999 |
| WO | WO 99/42832 | A1 | 8/1999 |
| WO | WO 2004/035217 | A1 | 4/2004 |
| WO | WO 2005/005049 | A1 | 1/2005 |
| WO | WO 2007/063174 | A1 | 6/2007 |

OTHER PUBLICATIONS

Translation of the International Preliminary Report on Patentability for PCT/EP2008/062539, dated Apr. 7, 2010.*

* cited by examiner

*Primary Examiner* — David A Reifsnyder
(74) *Attorney, Agent, or Firm* — Fanelli Haag & Kilger PLLC

(57) ABSTRACT

The present invention relates to a device and a method for treating liquids with magnetic particles, wherein at least one further central element which ensures collection and homogenization of the particles is additionally provided.

15 Claims, 4 Drawing Sheets

APPARATUS AND METHOD FOR THE TREATMENT OF LIQUIDS WITH MAGNETIC PARTICLES

FIELD OF THE INVENTION

The present invention relates to a device and a method for treating liquids with magnetic particles. The device and the method are suitable for example for applications in biochemistry, clinical chemistry, molecular biology, microbiology, medical diagnosis or forensic medicine.

TECHNICAL BACKGROUND

Many methods for treating liquids with magnetic particles are known in the prior art; these usually relate to the separation of nucleic acids or other biologically or biochemically relevant substances from a solution.

Methods which are based on magnetic separation by using specifically and/or nonspecifically binding magnetic particles have gained increasing importance in the field of sample preparation for diagnostic or analytical examinations, in particular for the isolation of nucleic acids, proteins and cells.

This applies in particular to automated methods, since in this way a large number of samples can be prepared within a short time and labor-intensive centrifuging steps can be obviated. The requirements for an efficient and high sample throughput are satisfied in this way. This is of enormous importance since purely manual handling of very large sample numbers is practically unfeasible.

The basic principle of the magnetic separation of substances from complex mixtures is based on providing magnetic particles with specific binding properties for the target substances to be separated, for example by chemically treating their surface. The size of such magnetic particles generally lies in the range of from about 0.05 to 500 μm, so that they have a large surface area for the binding reaction. Depending on their size and composition, the magnetic particles may have a density which is close to the density of the liquid in which they are suspended. In this case, sedimentation of the magnetic particles may readily take a few hours.

In known separation methods, the magnetic particles are immobilized at one position by using magnetic forces or a magnetic field, for example by means of a permanent magnet. This accumulation of the magnetic particles is also referred to as pellet or magnet sediment. The liquid supernatant is subsequently removed, for example by suction or pouring off, and discarded. The fact that the magnetic particles are immobilized by the magnetic forces substantially prevents magnetic particles from being removed together with the supernatant.

Typically, the immobilized magnetic particles are subsequently resuspended. In order to enrich the bound target substances, an elution liquid or elution buffer is used. The binding between the target substance and the magnetic particles is broken, and the target substance molecules are released from the magnetic particles. The target substance molecules can then be removed together with the elution liquid, while the magnetic particles are immobilized by the action of a magnetic field. In order to reduce the volume of elution liquid in relation to the primary starting volume for the binding, the target substance molecules may not only be enriched but also concentrated. Before the elution step, one or more washing steps may be carried out.

Various types of devices have been described for carrying out such separation methods by means of magnetic particles.

For instance, US 2001/0022948 describes a device in which a magnetic rod is immersed in a first reaction vessel which contains magnetic particles suspended in liquid.

There, the magnetic rod attracts the magnetic particles so that the magnetic particles adhere to the rod. The magnetic rod is then taken out of the reaction vessel, together with the magnetic particles adhering to it, and put into a second reaction vessel. There, the magnetic force of the rod can be reduced or switched off so that the magnetic particles are released from the rod and suspended in a liquid contained in the reaction vessel. Similar methods are also known from in U.S. Pat. No. 6,065,605 and WO 2005/005049.

On the other hand EP 0 965 842 discloses a device in which the magnetic particles, together with the liquid in which they are suspended, are taken up in a pipette. The pipette tip has a special separation region, to which a magnetic field can be applied by using a magnet. The magnetic particles are thereby immobilized as pellet or magnet sediment on the inside of the pipette tip. The aspirated liquid is subsequently removed from the pipette tip by the pipetting function of the device.

The magnetic field in the separation region can subsequently be removed, so that the magnetic particles immobilized in the pellet are released again. A similar method and a similar device are described in U.S. Pat. No. 6,187,270.

Another principle for the separation of magnetic particles is described by EP 015 905 520. In this case, the magnetic particles remain in the same reaction vessel while the liquid in this vessel is replaced. In order to adapt to a particular process step, the magnet sediments can be immobilized at a desired height on the side wall of the reaction vessel. This is done by providing magnets which are respectively arranged at a different distance from the rotation axis on various arms of a rotatably mounted carrier. By rotating the carrier, a particular arm—and therefore a particular magnet—can be brought into the vicinity of the side wall of the reaction vessel. The magnetic particles are then immobilized as pellet at this position.

Said conventional devices and methods all have the common feature that they are configured as so-called "open systems", since, according to their respective functional principle, magnetic rods or pipettes have to be introduced one or more times into the reaction vessel. These conventional devices and methods therefore entail the risk of cross-contaminating other reaction vessels by aerosol and/or droplet formation. Examination results may be vitiated or even unusable.

OBJECT OF THE PRESENT INVENTION

It is an object of the present invention to overcome the described difficulties encountered in the prior art and, in particular for a wide range of applications, to provide a device and a method by which liquids can be treated straightforwardly with magnetic particles.

The object is achieved by a device as claimed in claim 1 of the present invention. Accordingly, a device for treating liquids with magnetic particles is provided, comprising a multiplicity of first magnetic particles arranged in the liquid as well as at least one magnetic and/or magnetizable central element, preferably configured in the shape of a rod, dumbbell and/or ellipsoid, which is arranged in the liquid, wherein the ratio of the longest diameter d2 of the at least one central element to the ratio of the average diameter d1 of the magnetic particles is at least $$d2\ (\mathrm{mm}) \geqq 15 * d1\ (\mathrm{mm}).$$

The term "central element" in the context of the present invention is intended to mean, in particular, any object which is capable of binding at least the majority of the magnetic particles to itself in the resting state by magnetic field action—optionally under the action of a further "external" magnet (as described below).

According to a preferred embodiment of the invention, the at least one central element comprises a magnet, preferably a permanent magnet; according to an alternative preferred embodiment of the invention, the at least one central element comprises a magnetizable material, for example iron.

The term "liquids"—although not restricted to this—in the context of the present invention is intended to mean in particular aqueous solutions, suspensions and/or two-phase emulsions with water as one phase, which contain biomolecules.

The term "treat" in the context of the present invention is intended in particular to mean that particular biomolecules can accumulate on the magnetic particles in a separation step; the present invention is however expressly not restricted to this.

The term "diameter" of the magnetic particles means in particular, when the magnetic particles are not spherical or essentially spherical, the respectively longest diameter of the magnetic particles.

The term "average diameter" means in particular the arithmetic mean of the diameters of the magnetic particles, which may in particular (but without restriction to this) be measured by random sampling.

Such a device offers at least one of the following advantages for a wide range of applications within the present inventions:

- Owing to the fact that at least one central element is provided, homogenization of the magnetic particles as well as separation of the magnetic particles from the solution are readily possible, as described inter alia below.
- The device allows use in "closed" systems; to this extent, this represents a preferred embodiment of the invention.
- No other means are required (such as a bar magnet etc.) which are immersed directly in the liquid and therefore represent a possible contamination source.
- For most applications, there is very rapid and easy homogenization of the magnetic particles.
- Furthermore, rapid separation of the magnetic particles is usually possible.
- Besides the simple structure of the device, the technical outlay to be expended is at the same time usually very low.

According to a preferred embodiment of the invention, the ratio of the longest diameter d2 of the at least one central element to the ratio of the average diameter d1 of the magnetic particles is d2 (mm)≧50*d1 (mm), more preferably d2 (mm)≧100*d1 (mm), even more preferably d2 (mm)≧200*d1 (mm), and most preferably d2 (mm)≧300*d1 (mm).

This has proven advantageous for a wide range of applications within the present invention, since the desired inventive effects can thus often be achieved in a straightforward way.

According to a preferred embodiment, the ratio of the volume V2 of the at least one central element to the ratio of the average volume V1 of the magnetic particles is $$V2\ (mm^3) \geqq 10*V1\ (mm^3).$$

This has likewise proven favorable, since in this way it is possible to ensure that the magnetic particles accumulate again on the magnets after their homogenization (resuspension).

According to a preferred embodiment of the invention, the ratio of the volume V2 of the at least one central element to the ratio of the average volume V1 of the magnetic particles is V2 ($mm^3$)≧100*V1 ($mm^3$), more preferably V2 ($mm^3$)≧1000*V1 ($mm^3$) and most preferably V2 ($mm^3$)≧$10^5$*V1 ($mm^3$).

According to a preferred embodiment of the invention, the number of magnetic particles per central element is ≧$10^4$ to ≦$10^8$, preferably ≧$5\times10^5$ to ≦$5\times10^6$.

According to a preferred embodiment of the invention, the magnetic particles contain a material selected from the group paramagnetic materials, superparamagnetic materials, ferromagnetic materials, ferrimagnetic materials and mixtures thereof.

According to a preferred embodiment of the invention, the average saturation magnetization of the magnetic particles is ≧1 $Am^2/kg$ and 250 $Am^2/kg$, preferably ≧10 $Am^2/kg$ and 240 $Am^2/kg$, and most preferably ≧20 $Am^2/kg$ and 235 $Am^2/kg$. This has proven advantageous for many applications of the present invention.

According to a preferred embodiment of the invention, the at least one central element is configured in the shape of a rod, dumbbell and/or ellipsoid, and the ratio of the longest diameter a (or length) to the ratio of the shortest diameter b is from $$a/b \geqq 1.1 \text{ to } a/b \leqq 10.$$

This has proven favorable in particular for straightforward homogenization of the magnetic particles in many applications. According to a preferred embodiment of the invention, the at least one central element is configured in the shape of a rod, dumbbell and/or ellipsoid, and the ratio of the longest diameter a (or length) to the ratio of the shortest diameter b is from a/b≧1.5 to a/b 8, preferably a/b≧2 to a/b≦5.

According to a preferred embodiment of the invention, the magnetic particles and the at least one central element are arranged in a closed vessel.

According to a preferred embodiment of the invention, the combined volume of the magnetic particles $V_m$ plus the at least one central element is from ≧0.25% to ≦50% of the total volume $V_G$ of the vessel. This has proven favorable for many applications.

Preferably, the combined volume of the magnetic particles $V_m$ plus the at least one central element is from ≧0.5% to ≦20%, even more preferably ≧1% to ≦15%, of the total volume $V_G$ of the vessel.

According to a preferred embodiment of the invention, the device according to the invention furthermore comprises at least one external magnet 30, which is configured to interact with the at least one central element.

For the case in which the central element is a permanent magnet, according to a preferred embodiment of the invention the ratio of the magnetic strength $H_3$ of the at least one external magnet to the magnetic strength $H_2$ of the at least one central element is $$H_3 \geqq 1.1*H_2 \text{ to } H_3 \leqq 10*H_2$$

This has proven favorable since the at least one central element can thus on the one hand often be influenced very well according to the invention, and on the other hand the homogenization or accumulation of the magnetic particles on the at least one central element is not unnecessarily affected.

According to a preferred embodiment of the invention, the ratio of the magnetic strength $H_3$ of the at least one external magnet to the magnetic strength $H_2$ of the at least one central element is $H_3 \geqq 1.5*H_2$ to $H_3 \leqq 8*H_2$, even more preferably $H_3 \geqq 2*H_2$ to $H_3 \leqq 5*H_2$.

According to a preferred embodiment of the invention, the at least one external magnet is and/or comprises an electromagnet(s) operated by AC voltage in order to homogenize the magnetic particles. In this embodiment, the central element is then preferably a (permanent) magnet.

According to a preferred embodiment of the invention, the at least one external magnet is and/or comprises a (permanent) magnet(s).

The present invention furthermore relates to a method for treating liquids with magnetic particles, comprising a multiplicity of first magnetic particles arranged in the liquid as well as at least one central element, preferably configured in the shape of a rod, dumbbell and/or ellipsoid, which is arranged in the liquid, comprising the steps of a) distributing the magnetic particles in the liquid, and subsequently b) accumulating the magnetic particles on the at least one central element.

Such a method offers at least one of the following advantages for a wide range of applications within the present inventions:

Owing to the fact that at least one central element is provided, homogenization of the magnetic particles as well as separation of the magnetic particles from the solution are readily possible, as described inter alia below.

The method allows use in "closed" systems; to this extent, this represents a preferred embodiment of the invention.

No other means are required (such as a bar magnet etc.) which are immersed directly in the liquid and therefore represent a possible contamination source.

For most applications, there is very rapid and easy homogenization of the magnetic particles.

Furthermore, rapid separation of the magnetic particles is usually possible.

Besides the simple structure of the method, the technical outlay to be expended is at the same time usually very low.

According to a preferred embodiment of the invention, step a) comprises resuspension of the magnetic particles in the liquid.

According to a preferred embodiment of the invention, the magnetic particles have been at least partially accumulated on the at least one central element before step a), and step a) is carried out by the action of a force on the at least one central element.

According to a preferred embodiment of the invention, step b) is assisted by means of a further, external permanent magnet. This is preferably done by placing an external permanent magnet in the vicinity of the vessel which contains the magnetic particles and the at least one central element. In this way, in many embodiments of the present invention, the accumulation of the magnetic particles on the at least one central element can be made significantly more rapid. This embodiment has also proven advantageous in particular when the at least one central element is not a permanent magnet.

According to a preferred embodiment of the invention, the method according to the invention comprises a device according to the invention.

The present invention furthermore relates to the use of a device according to the invention and/or a method according to the invention for the at least partial separation of biomolecules from/in a preferably aqueous solution.

The term "biomolecules"—although not restricted to this—in the context of the present invention is intended to mean all biomolecules, for example lipids, carbohydrates, metabolites, metabolic products, all types of nucleic acids, all types of peptides and proteins, including substituted or functionalized peptides and/or proteins.

The term "biomolecules"—although not restricted to this—in the context of the present invention is furthermore intended to mean all molecules naturally occurring in or artificially introduced into biological samples.

According to a preferred embodiment of the invention, the device according to the invention and/or the method according to the invention is used for the at least partial separation of nucleic acids from/in a preferably aqueous solution.

The term "nucleic acid"—although not restricted to this—in the context of the present invention is intended to mean in particular natural, preferably isolated, linear, branched or circular nucleic acids such as RNA, in particular mRNA, siRNA, miRNA, snRNA, tRNA, hnRNA ribosomes, DNA and the like, synthetic or modified nucleic acids, for example oligonucleotides, in particular primers, probes or standards used for the PCR, digoxigenin-, biotin- or fluorescent dye-labeled nucleic acids or so-called PNAs ("peptide nucleic acids").

The components to be used according to the invention, as mentioned above and claimed and described in the exemplary embodiments, are not subject to any particular exclusion conditions in respect of their size, shaping, material selection and technical conception, so that the selection criteria known in the field of application may be used without restriction.

Other details, features and advantages of the subject-matter of the invention may be found in the dependent claims and the following description of the associated figures and examples, in which—by way of example—several exemplary embodiments and possible uses of the present invention are presented.

FIG. 1 shows a very schematic view of a device according to the invention according to an exemplary embodiment. It should be noted that FIGS. 1 and 2 are highly schematic, and in most applications of the invention the actual conditions (whether size proportions such as the number of magnetic particles) will be different.

Figure 1A:
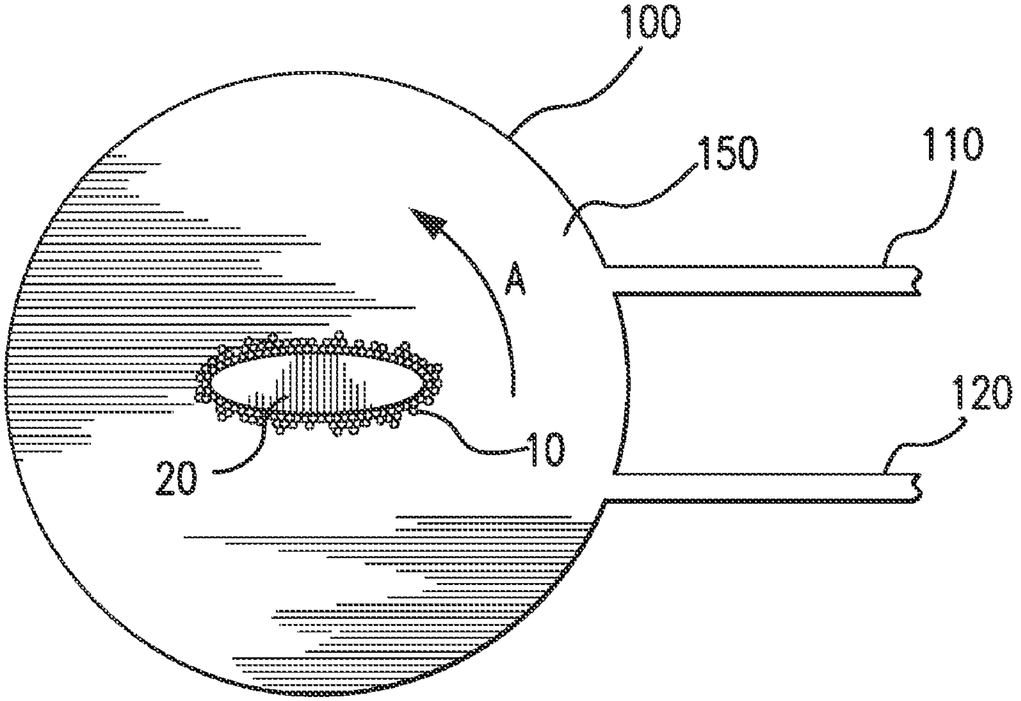
FIG. 1A-1B shows a very schematic view of a device according to the invention according to an exemplary embodiment of the invention before "homogenization" of the magnetic particles.

The device comprises a plurality of first magnetic particles 10 which, in the "resting state", are accumulated on a central unit 20. The magnetic particles 10 and the central magnet 20 are arranged in a (preferably closed) vessel 100 which may optionally have in- and outlets 110 and 120, respectively (schematically indicated by lines). The vessel 100 is preferably filled with a liquid 150 to a level such that the magnetic particles 10 and the central element 20 lie in the liquid.

In the present embodiment, the central element 20 is a permanent magnet; this is not however restrictive. As already explained, the central element 20 may also contain a magnetizable material such as iron.

By moving the central element 20 (for example by rotation in the direction of the arrow A or alternatively by shaking), which is preferably done by means of a further magnet (not shown in the Fig.), it is possible to "release" (essentially "shake off") the magnetic particles from the central element 20 and distribute them in the vessel so that (depending on the specific application) biomolecules, for example, can accumulate on the magnetic particles.

It should be pointed out here that in many applications of the present invention it has been found favorable that, when a circular (or quasi-circular) movement of the central element 20 takes place, the center of the "imaginary" circle does not lie in the vicinity of the center of the vessel 100. The effect often achieved by this arrangement is that the magnetic particles 10 are “spun away” well from the central element 20 during the homogenization, which further facilitates the homogenization step. This therefore represents a preferred embodiment of the present invention.

Another embodiment for moving the at least one central element is a one-dimensional oscillating movement. Under the effect of a magnetic field, which moves to and fro on a line, the at least one central element is alternately “knocked” against the opposing vessel walls, so that the magnetic particles are again effectively shaken off from the central element 20.

A shaking movement of the at least one central element may also be carried out by means of an electromagnet, if the latter is operated with AC voltage and the poling of the magnetic field changes alternately, to which extend this likewise represents a preferred embodiment of the invention. If the operating mode is changed to direct current, then magnetic separation takes place.

Figure 2:
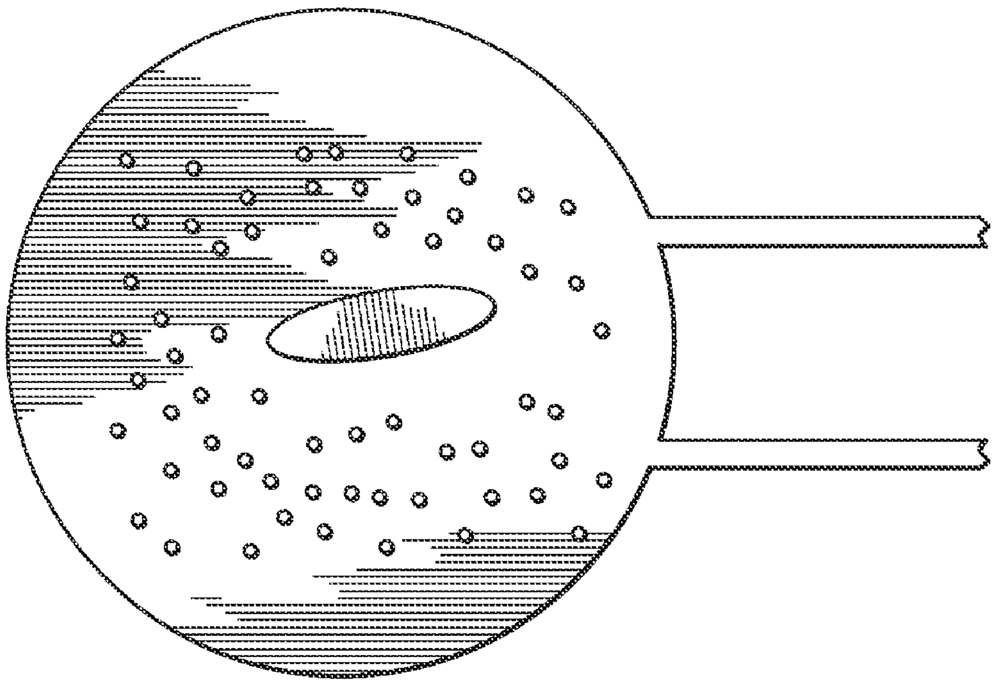
FIG. 2 shows the device of FIG. 1 after "homogenization"

The state after this “homogenization” is shown very schematically in FIG. 2.

Figure 1B:
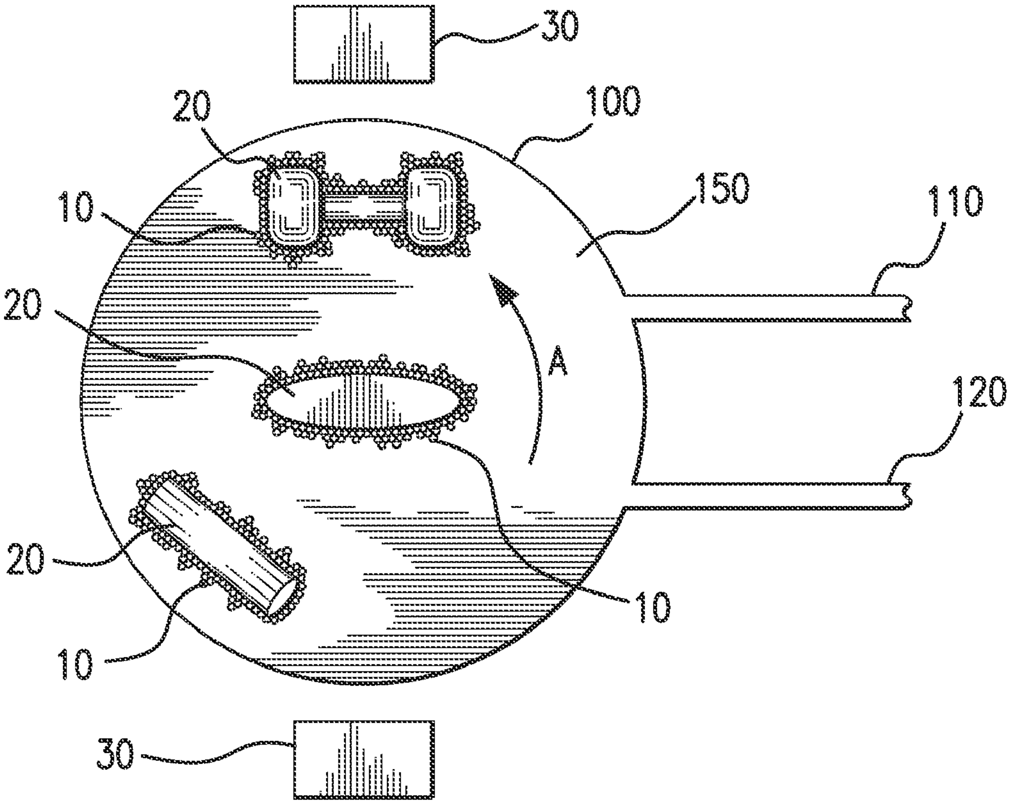

If the movement of the central element 20 is stopped, then the magnetic particles 10 accumulate again on the central element 20 so that (essentially) the state in FIG. 1 is reached again. The liquid 150 may now for example be removed from the vessel or further reagents may be added, depending on the specific application.

The invention will likewise be explained below with the aid of examples. It is to be understood that these should be interpreted purely illustratively and are not intended to constitute any restriction of the present invention, which is defined exclusively by the claims.

It should in particular be mentioned explicitly that the present example is also to be interpreted purely illustratively in respect of the described size/volume/quantity data, or the geometrical configurations of the reaction vessel. As has been shown in many applications and exemplary embodiments, the present invention may be employed in a wide size range and a person skilled in the art will correspondingly select other dimensions or arrangements. Besides the advantage of carrying out the method as a closed system, the option is naturally also available to configure it as an open system (see Example I). In particular, it has been found that the present invention may also be used very well in microsystems such as micromixers etc. in many applications, which represents a preferred embodiment of the present invention.

EXAMPLE I

Preparation of Genomic DNA from 5 ml of Whole Blood

Genomic DNA was isolated from 5 ml of whole blood by means of the following procedure:

5 ml of blood were put into a 30 ml beaker having a central element (standard Teflon-coated stirring flea; length 2 cm; diameter 7 mm).

5 ml of AL buffer (branded product of QIAGEN) and 500 µl of proteinase K (QIAGEN) were subsequently added. Incubation was carried out for 30 min at 60° C. on a magnetic heating stirrer with a slow stirring rate.

5 ml of isopropanol and 500 µl of MagAttract Suspension G (QIAGEN), which contained the magnetic particles, were then added; the average diameter of the particles is 8 µm.

By means of an external magnetic stirrer, stirring was carried out for 5 min in order to bind the genomic DNA to the magnetic particles.

The stirrer was subsequently stopped, whereupon the magnetic particles accumulated on the central element. The supernatant was removed, and 15 ml of AW1 washing buffer (QIAGEN) were added. Homogenization of the magnetic particles was carried out by stirring for 60 sec, followed by magnetic separation again by stopping the stirrer.

The supernatant was again removed and 15 ml of AW2 washing buffer (QIAGEN) were added. The magnetic particles were subsequently homogenized by stirring for 60 sec. After stopping the stirrer, accumulation of the magnetic particles on the central element took place.

The supernatant was removed, and then the magnetic particles were air-dried for 20 min.

In order to elute the DNA, 5 ml of TE buffer (DNA Elution, QIAGEN) were added. The magnetic particles were then homogenized by stirring for 5 min, and after the stirring stopped the magnetic particles accumulated on the central element.

The supernatant, which now contained the DNA, was transferred into a suitable storage tube and the DNA concentration was measured by UV quantification and an OD scan.

Figure 3:
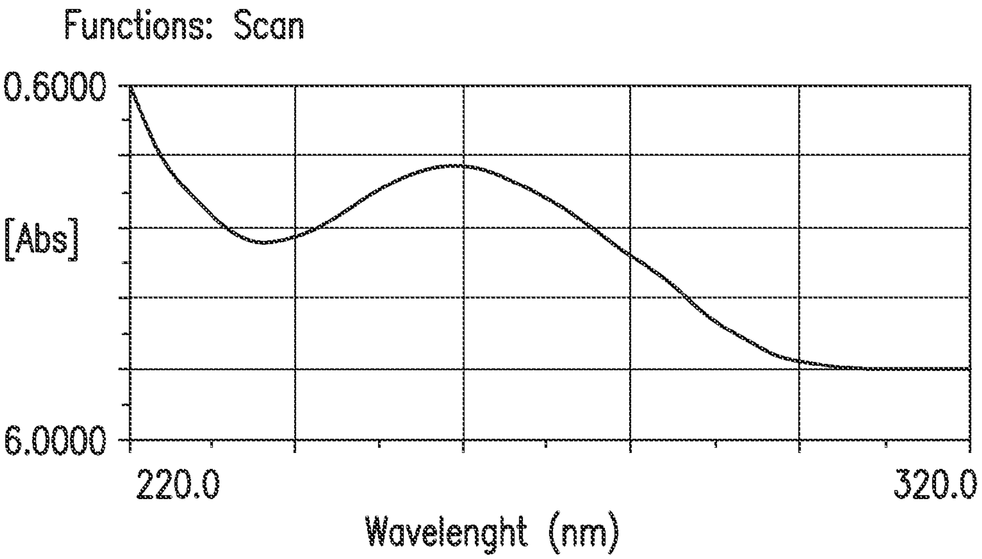
FIG. 3 shows a UV curve of a DNA elution solution after having carried out a genomic DNA preparation according to Example I.

The UV curve of the supernatant is shown in FIG. 3. The yield can be estimated with the aid of the UV spectrum, which was done approximately quantitatively in Example 1 (about 170 µg of genomic DNA from 5 ml of whole blood).

The invention claimed is:

1. A device for treating a liquid with magnetic particles, the device comprising a vessel having an inlet and an outlet, a multiplicity of magnetic particles arranged in the liquid and at least one magnetic and/or magnetizable central element shaped as a rod, dumbbell or ellipsoid, which is arranged in the liquid, wherein a ratio of a longest diameter d2 of the at least one magnetic and/or magnetizable central element to an average diameter d1 of the magnetic particles is at least $$d2\ (\text{mm}) \geqq 15 * d1\ (\text{mm}).$$

2. The device as claimed in claim 1, wherein the ratio of the volume V2 of the at least one magnetic and/or magnetizable central element to the ratio of the average volume V1 of a magnetic particle is $$V2\ (\text{mm}^3) \geqq 10 * V1\ (\text{mm}^3).$$

3. The device as claimed in claim 1, wherein the number of magnetic particles per magnetic and/or magnetizable central element is $\geqq 10^4$.

4. The device as claimed in claim 1, wherein the magnetic particles contain a material selected from the group consisting of paramagnetic, materials, superparamagnetic materials, ferromagnetic materials, ferrimagnetic materials and mixtures thereof.

5. The device as claimed in claim 1, wherein the at least one magnetic and/or magnetizable central element is configured in the shape of a rod, dumbbell or ellipsoid, and the ratio of the longest diameter a (or length) of the magnetic and/or magnetizable central element to the ratio of the shortest diameter b of the magnetic and/or magnetizable central element is from $$a/b \geqq 1.1 \text{ to } a/b \leqq 10.$$

6. The device as claimed in claim 1, wherein the combined volume of the magnetic particles $V_m$ plus the at least one magnetic and/or magnetizable central element is from $\geqq$0.25% to $\leqq$50% of the total volume $V_G$ of the vessel.

7. The device as claimed in claim 1, additionally comprising at least one external magnet, which is configured to interact with the at least one magnetic and/or magnetizable central element.

8. The device as claimed in claim 1, wherein the magnetic and/or magnetizable central element comprises at least one permanent magnet, and the ratio of the magnetic strength $H_3$ of the at least one external magnet to the magnetic strength $H_2$ of the at least one magnetic and/or magnetizable central element is $$H_3 \geqq 1.1 * H_2 \text{ to } H_3 \leqq 10 * H_2.$$

9. The device as claimed in claim 7, wherein the at least one external magnet is an electromagnet.

10. The device as claimed in claim 7, wherein the at least one external magnet is a permanent magnet.

11. A method for treating a liquid with magnetic particles, comprising a multiplicity of magnetic particles arranged in the liquid as well as at least one magnetic and/or magnetizable central element shaped as a rod, dumbbell or ellipsoid, which is arranged in the liquid, the liquid being in a vessel having an inlet and an outlet, the method comprising a) distributing the magnetic particles in the liquid, and subsequently b) accumulating the magnetic particles on the at least one magnetic and/or magnetizable central element.

12. The method as claimed in claim 11, further comprising resuspension of the magnetic particles in the liquid following the accumulating in b).

13. The method as claimed in claim 11, wherein the magnetic particles have been at least partially accumulated on the at least one magnetic and/or magnetizable central element before a), and a) is carried out by the action of a force on the at least one magnetic and/or magnetizable central element.

14. The method as claimed in claim 11, wherein the ratio of the longest diameter d2 of the at least one magnetic and/or magnetizable central element to the ratio of the average diameter d1 of the magnetic particles is at least d2 (mm)$\geqq$15*d1 (mm).

15. The method of claim 11 comprising accumulating the magnetic particles on the at least one magnetic and/or magnetizable central element, wherein the magnetic particles further comprise biomolecules and wherein the liquid is an aqueous solution.

* * * * *